June 24, 1930.  E. W. RIEMENSCHNEIDER  1,765,384
TUBULAR COLUMN FORMING MACHINE
Original Filed Aug. 30, 1926    5 Sheets-Sheet 1
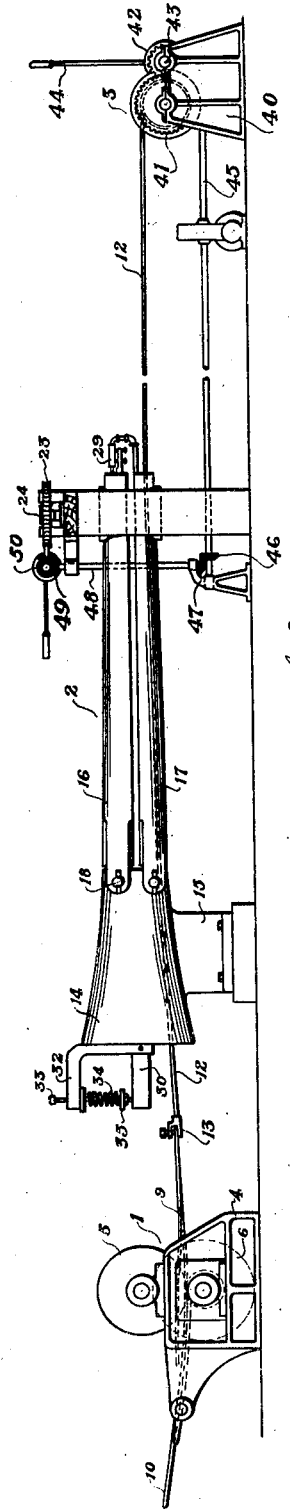
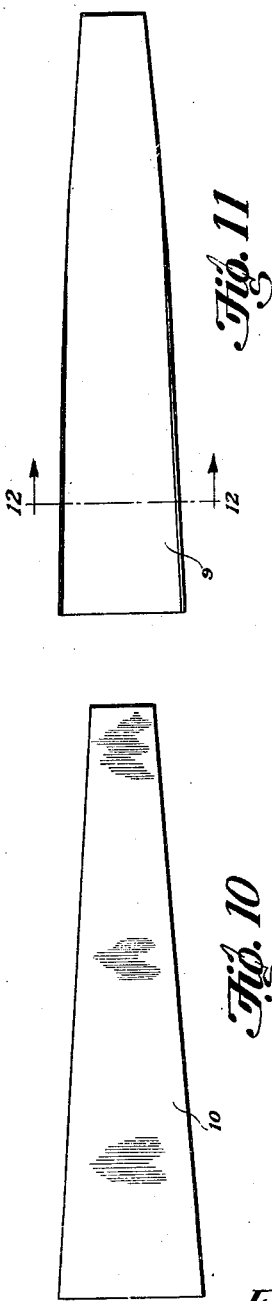
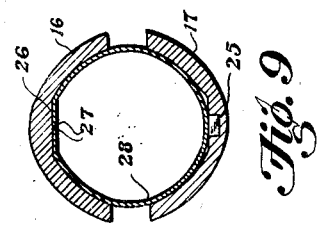
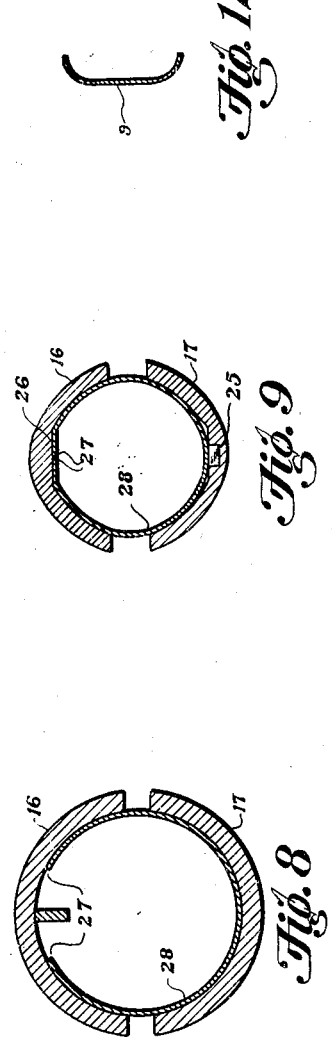
Inventor
*E. W. Riemenschneider*
Attorneys Inventor
E. W. Riemenschneider June 24, 1930. E. W. RIEMENSCHNEIDER 1,765,384
TUBULAR COLUMN FORMING MACHINE
Original Filed Aug. 30, 1926  5 Sheets-Sheet 3
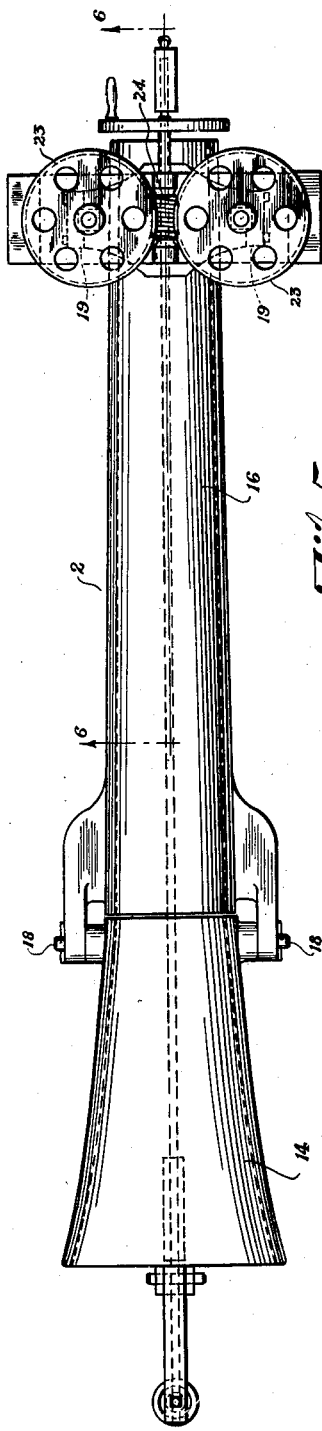
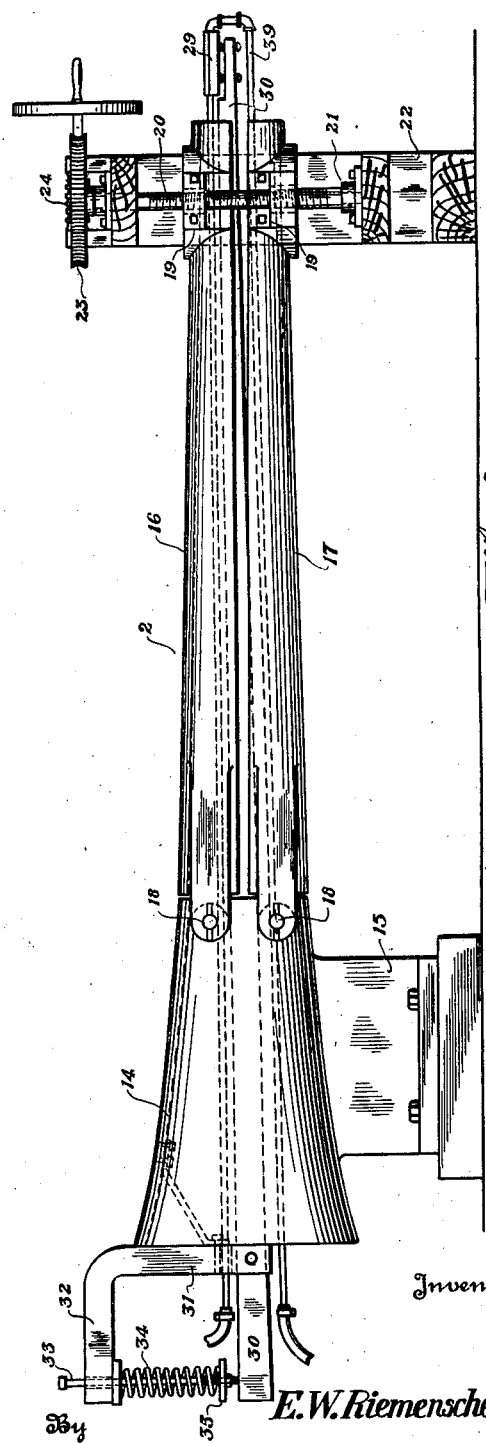
Inventor
E. W. Riemenscheider
By Frean and Boud Attorneys

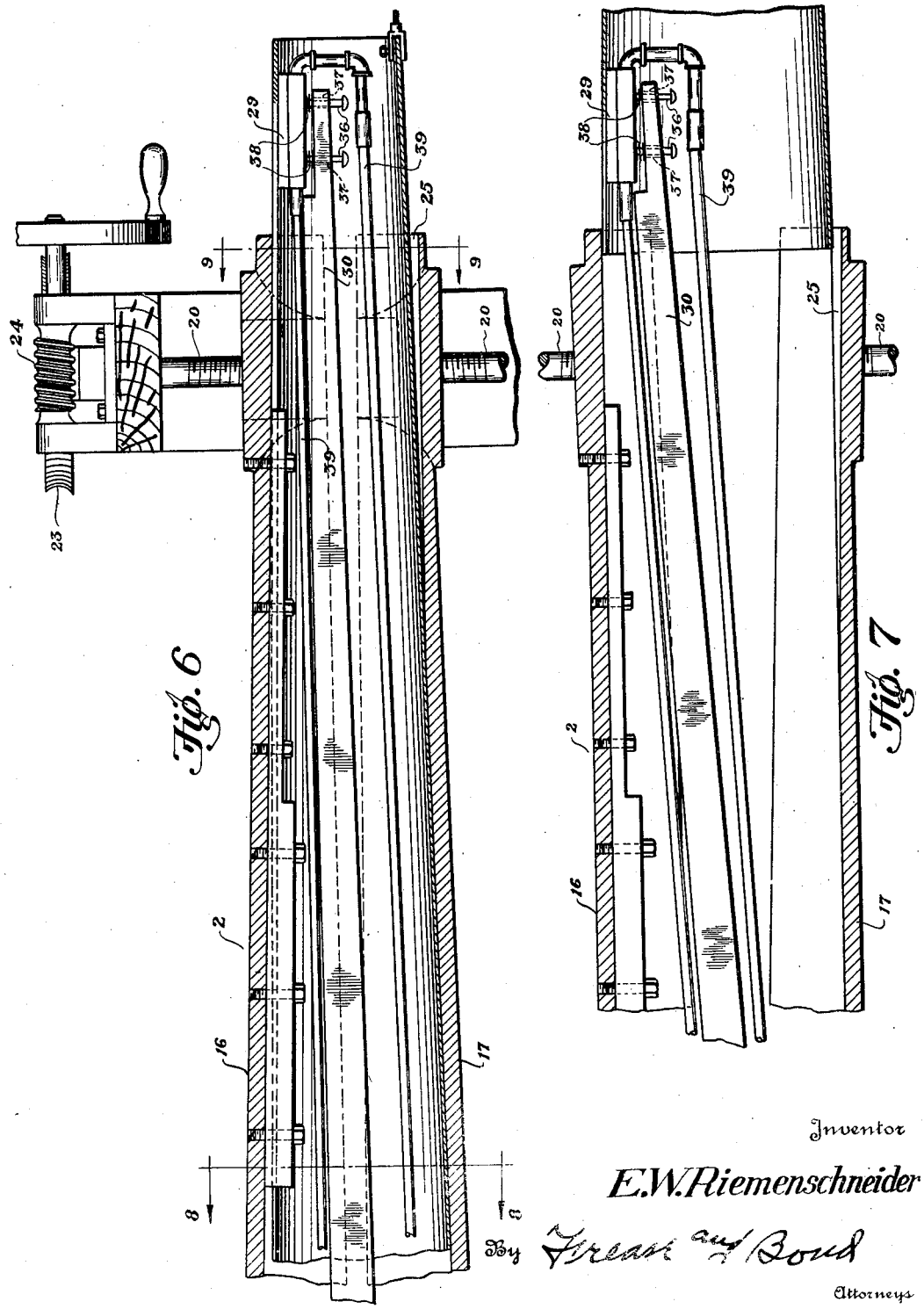

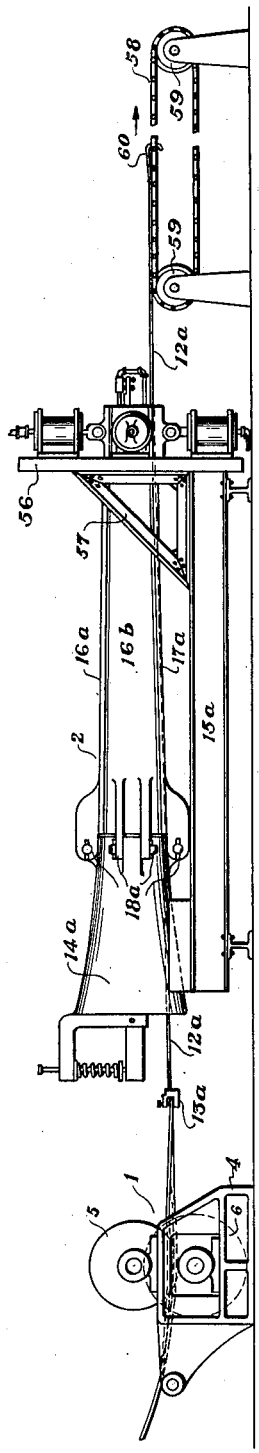
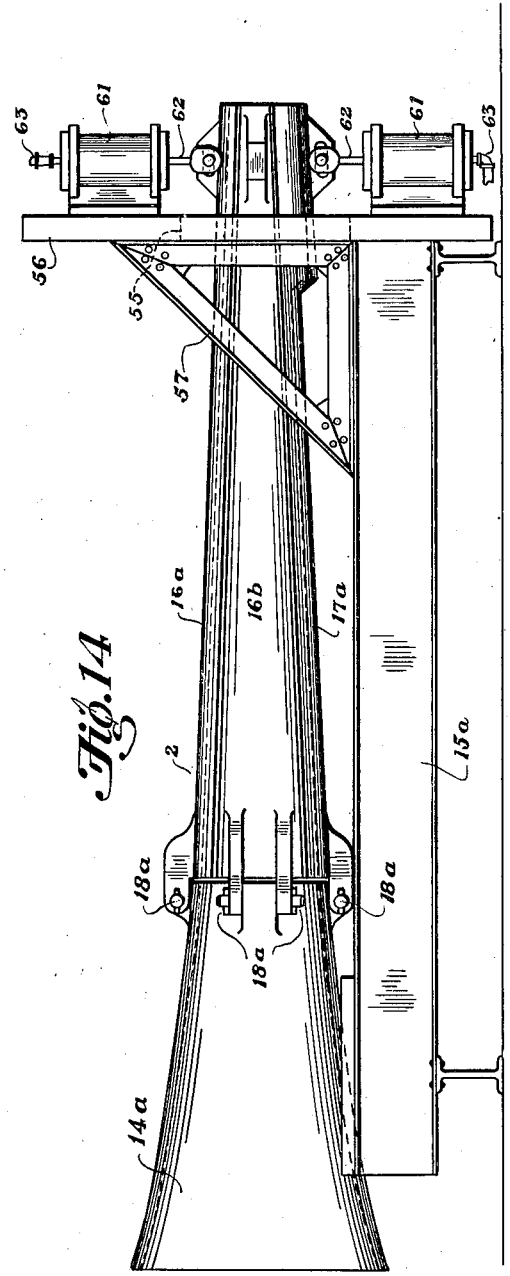

Patented June 24, 1930

1,765,384

UNITED STATES PATENT OFFICE

EDMUND W. RIEMENSCHNEIDER, OF CANTON, OHIO, ASSIGNOR TO THE UNION METAL MANUFACTURING COMPANY, OF CANTON, OHIO, A CORPORATION OF OHIO

TUBULAR-COLUMN-FORMING MACHINE

Application filed August 30, 1926, Serial No. 132,369. Renewed January 10, 1928.

The invention relates to machines for forming tubular sheet metal columns and more particularly to an apparatus for forming tapered columns adapted to be afterwards fluted and used for lighting standards, building columns and the like.

The object of the improvement is to provide a machine arranged to form a sheet metal blank into a tapered tubular shape abutting the edges thereof together as the tube emerges from the machine, means being provided for welding the abutting edges at this point; the machine comprising a plurality of relatively adjustable, curved tube forming dies through which the material is passed, means being provided for coordinating the adjusting of the dies with the speed of travel of the material therethrough.

Figure 2:
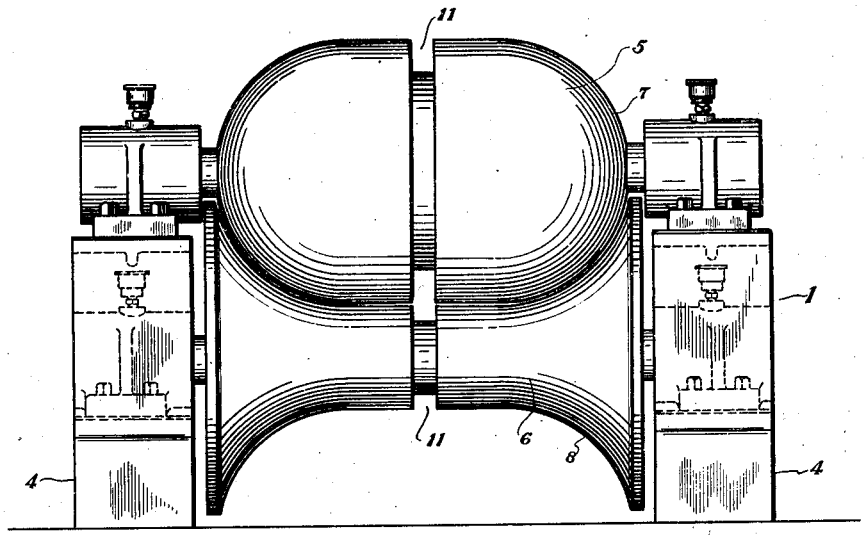
Figure 3:
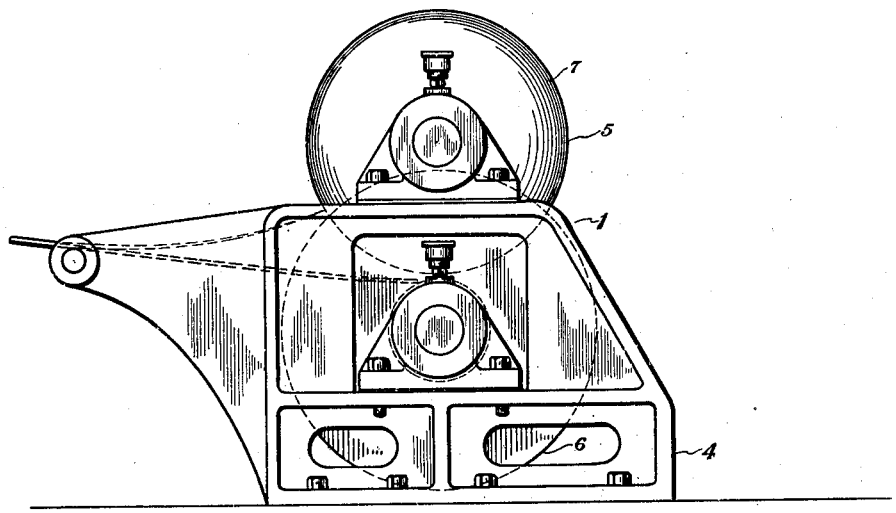

An embodiment of the invention is illustrated in the accompanying drawings, in which Figure 1 is a side elevation of the improved machine showing two forming dies;
Fig. 2, an enlarged side elevation of the initial bending rollers;

Fig. 3, an end elevation of the same;

Fig. 4, an enlarged side elevation of the forming dies shown in Fig. 1;
Fig. 5, a plan view of the same;

Fig. 6, a fragmentary longitudinal sectional view of the two forming dies on a still larger scale;

Fig. 7, a similar view showing the two forming dies in the extreme open position;

Fig. 8, a transverse section on the line 8—8, Fig. 6;

Fig. 9, a transverse section on the line 9—9, Fig. 6;
Fig. 10, a plan view of the sheet blank from which the column is formed;

Fig. 11, a plan view of the blank after being passed through the initial forming rolls;

Fig. 12, a transverse sectional view of the same taken substantially on the line 12—12, Fig. 11;

Fig. 13, a view similar to Fig. 1 showing the machine provided with four cooperating forming dies; and Fig. 14, an enlarged side elevation of the forming dies shown in Fig. 13.

Similar numerals refer to similar parts throughout the drawings.

Referring first to the form of the invention illustrated in Figs. 1 to 9, the apparatus comprises three associated units including the initial forming device indicated generally at 1, the tube forming mechanism shown generally at 2, and suitable means for pulling the blank through the initial forming and tube forming means, such as the windlass or drum shown generally at 3.

The initial forming or bending device comprises the side housings 4 in which are journaled upper and lower bending or forming rolls 5 and 6 respectively.

The upper roll is provided with the substantially rounded end portions 7, and the lower roll has its end portions substantially coned, as at 8, to cooperate therewith, to produce a shallow, trough-like blank 9, as shown in Figs. 11 and 12, from the tapered sheet blank 10 as shown in Fig. 10.

Each of the rolls 5 and 6 is provided with the central annular groove 11, to accommodate the cable 12 and clamp 13 which is attached to the forward end of the sheet blank, this cable being passed entirely through the tube forming device 2, and connected to the windlass or drum 3, for drawing the blank through the initial bending device 1.

The tube forming die includes the bell 14, fixed upon a stand 15, and flared toward the initial bending device. The upper and lower expansible forming die sections 16 and 17 respectively are of substantially troughlike cross-sectional shape, and hingedly connected as at 18, to the smaller end of the bell 14, the free end portions of said dies being provided with the internally threaded bearing lugs 19, through which are located the left and right screws 20, journaled at their lower ends in bearings 21 mounted upon the base 22, and provided at their upper ends with the worm wheels 23, meshing with the worm 24. The screws 20 are provided for adjusting the position of the forming dies to the taper of the tube and to resist expansion of the dies except as hereinafter set forth.

The lower tube forming die, as shown in the drawing, is provided with a groove 25, to accommodate the cable 12 and clamp 13, and the upper tube forming die is preferably provided with the flattened portion 26, to bring the meeting edge portions 27 of the tube 28 into the position shown in Fig. 9, in order to permit the same to be easily welded.

For the purpose of welding the abutting edges of the sheet together an anvil 29 may be mounted upon the arm 30, pivoted near its rear end to the bracket 31, at the large end of the bell.

This bracket is provided with a rearwardly disposed arm 32, at its upper end, through which is located the rod 33, normally exerting pressure downwardly on the rear end portion of the arm 30, by means of the coil spring 34, interposed between the bracket arm 32 and the shoulder 35, upon the rod, thus holding the anvil at all times in engagement with the interior of the tube, adjacent to the seam thereof, as shown in Figs. 6 and 7.

For the purpose of permitting the anvil to adjust itself to the taper of the tube, a pair of pins 36 are fixed to the anvil and extend through the elongated openings 37 in the free end portion of the arm 30, springs 38 surrounding said pins and being interposed between the arm and anvil.

Any suitable welding device may be applied to the abutted edge portions of the tube, as it emerges from the forming dies, and for the purpose of keeping the anvil cool, water may be circulated therethrough as by the pipes 39.

The pulling apparatus comprises the windlass, or drum 3, journaled in suitable housings 40, the cable 12 being connected to said drum and arranged to be wound thereon by applying power to the drum. A gear 41 may be fixed upon the drum and meshing with the pinion 42, upon a shaft 43, arranged to be connected to any suitable source of power, through a clutch operated by the lever 44.

For the purpose of coordinating the opening movement of the tube forming tubular dies with the movement of the tube therethrough, the screws 20 may be operatively connected to the drum 3 in any suitable manner, as by the gearing shown in Fig. 1, comprising a shaft 45 operatively connected in any suitable manner to the drum, and provided with a beveled pinion 46, meshing with the pinion 47, upon the vertical shaft 48, which is provided with a pinion 49, meshing with a similar pinion 50, upon the worm 24.

In operating the device, the clamp 13, upon the cable, is connected to the narrow end of the sheet blank 10, and the drum 3 is operated, drawing the sheet blank first through the initial forming or bending rolls, where it assumes the trough-like shape, as shown in Figs. 11 and 12, and then through the forming dies, the sheet being formed into tubular shape as it passes through the smaller end thereof.

It will be understood that the forming device is so adjusted that as the smaller end of the tube, thus formed, reaches the outer end of the forming dies the free edges of the sheet will just meet, as shown in Fig. 9, and as the apparatus continues to operate the forming dies will slowly open, always maintaining the same cross-sectional size as that portion of the column passing through the outer end of the dies at the time, the dies finally assuming substantially the position shown in Fig. 7 as the large end of the tube passes therethrough.

The seam is welded over the anvil continuously, as the tube emerges from the forming dies, and as these dies are adjusted so as to always hold the free edges of the sheet abutting each other as it emerges from the forming dies, a perfectly welded, tapered, tubular shaft is produced.

In Figs. 13 and 14 is illustrated a slightly modified form of the invention, in which a forming die having four forming die sections, each of substantially one-fourth of a complete circle, may be employed for shaping the blank into tubular form.

The initial forming or bending apparatus 1 may be of the same construction and operation as illustrated in Figs. 1 to 3 and described above.

The tube forming mechanism may include the bell 14$^a$, fixed upon the stand 15$^a$, and flared toward the initial bending device. The upper and lower expansible tube forming die sections 16$^a$ and 17$^a$ respectively, as well as the side expansible tube forming die sections 16$^b$ are of trough-like cross-section, each being substantially one-fourth of a complete circle.

These forming dies are hingedly connected to the smaller end of the bell 14$^a$, as shown at 18$^a$, the free end portions of said dies being extended through the enlarged central opening 55 in the face plate 56, which is fixed to the forward end of the stand 15$^a$ and may be braced as shown at 57.

As illustrated and described in the other form of the invention, the upper forming die may be provided with the flattened portion to bring the meeting edges of the tube into position for easy welding; while the lower forming die may be provided with a groove to accommodate the cable 12$^a$ and clamp 13$^a$.

The anvil for use in welding the abutting edges of the sheet together may be of the same construction as elsewhere herein described and illustrated.

The pulling apparatus may comprise the endless chain 58, located over the sprocket wheels 59, and driven in any suitable manner, in the direction of the arrow shown in Fig. 13.

The cable 12$^a$ may be provided with a hook 60 for engagement at any desired point with the endless chain 58, whereby the blank will be continuously pulled through the initial forming rolls and tube forming dies, in the manner above described.

For the purpose of adjusting the positions of the forming dies to the taper of the tube, being formed therein, as the tube is passed through the dies, a fluid cylinder 61 may be fixed upon the face plate 56, adjacent to each forming die, and connected thereto by the piston rod 62.

The pipes 63 from all of the cylinders should lead to a suitable accumulator (not shown) for the purpose of equalizing the pressure upon the several forming dies.

As the tube is formed, within the dies, the abutting edges thereof will tend to hold the tube rigid and the pistons will be slowly forced back in the cylinders as the increasing diameter of the tube passes through the free end portions of the dies.

The forming die yielding means disclosed but not claimed herein is claimed in a copending application of Edmund W. Riemenschneider, for making tapered tubular poles, filed July 26, 1927, Serial No. 208,491, Patent No. 1,746,281, dated February 11, 1930.

I claim:

1. A tapered, tubular column forming apparatus including a pair of initial bending rolls for bending a sheet blank into trough shape, a plurality of curved forming dies for forming the trough shape blank into a tapered tube, means for pulling the blank through the bending rolls and forming dies, and means for adjusting the forming dies to the taper of the tube.

2. A tapered, tubular column forming apparatus including a pair of initial bending rolls for bending a sheet blank into trough shape, a plurality of curved forming dies for forming the trough shape blank into a tapered tube, means for pulling the blank through the bending rolls and forming dies, and means for separating the forming dies to conform to the taper of the tube as the blank is pulled therethrough.

3. A tapered, tubular column forming apparatus including curved forming dies for forming a blank into a tapered tube, means for passing the blank through the forming dies and means for adjusting the forming dies to the taper of the tube.

4. A tapered, tubular column forming apparatus including curved forming dies for forming a blank into a tapered tube, means for passing the blank through the forming dies and means for separating the forming dies as the blank is passed therethrough.

5. A tapered, tubular column forming apparatus including curved forming dies for forming a blank into a tapered tube, means for passing the blank through the forming dies and means co-ordinated with said passing means for adjusting the forming dies to the taper of the tube.

6. A tapered, tubular column forming apparatus including curved forming dies for forming a blank into a tapered tube, means for passing the blank through the forming dies and means co-ordinated with said passing means for separating the dies to conform to the taper of the tube.

7. A tapered, tubular column forming apparatus including curved forming dies for forming a blank into a tapered tube, a drum, a cable attached to the drum for pulling a blank through the dies and an operative connection between the drum and dies for adjusting the dies to the taper of the tube.

8. A tapered, tubular column forming apparatus including curved forming dies for forming a blank into a tapered tube, a drum, a cable attached to the drum for pulling a blank through the dies and an operative connection between the drum and dies for separating the dies to conform to the taper of the tube.

9. A tapered tube forming apparatus comprising a bell, a plurality of trough-like forming dies hingedly connected, at one end, to the smaller end of said bell, means for passing a sheet blank through the bell and forming dies, and means for separating the free ends of the dies as the blank is passed therethrough.

10. A tapered tube forming apparatus comprising a bell, a plurality of trough-like forming dies hingedly connected, at one end, to the smaller end of said bell, means for passing a sheet blank through the bell and forming dies, and means coordinated with the movement of the blank for separating the free ends of the dies as the blank is passed therethrough.

11. Apparatus for forming tapered tubular sheet metal columns, including a bell, a tapered tubular tube forming die having a plurality of sections hinged to the small end of the bell, and means pressing the free ends of the die sections together.

12. Apparatus for forming tapered tubular sheet metal columns, including an expansible tubular tube forming die having a plurality of sections, means resisting an expansion of the die, means for welding together the edges of a column formed in the die, and means for passing a sheet blank through the die.

13. Apparatus for forming tapered tubular sheet metal columns, including initial bending means and a final expansible tapered-tube forming die having a plurality of sections.

14. Apparatus for forming tapered tubular sheet metal columns, including initial bending rolls, and final expansible tapered tubular tapered-tube forming means.

15. Apparatus for forming tapered tubular sheet metal columns, including initial bending rolls, final expansible tapered tubular tapered-tube forming means, and means applied to one end of a sheet blank for passing the same therethrough.

16. Apparatus for forming tapered tubular sheet metal columns, including initial bending rolls, a final expansible tubular tapered-tube forming die having a plurality of sections, and means for welding together the edges of a column formed in the die.

17. Apparatus for forming tapered tubular sheet metal columns, including initial bending rolls, a final expansible tubular tapered-tube forming die having a plurality of sections, and means for passing a sheet blank therethrough.

18. Apparatus for forming tapered tubular sheet metal columns, including initial bending rolls, a final expansible tapered-tube forming die having a plurality of sections and means resisting an expansion of the die.

19. Apparatus for forming tapered tubular sheet metal columns, including initial bending rolls, and a final expansible tapered-tube forming die having a plurality of sections.

20. Apparatus for forming tapered tubular sheet metal columns, including initial bending means, and final expansible tapered tubular tapered-tube forming means.

In testimony that I claim the above, I have hereunto subscribed my name.

EDMUND W. RIEMENSCHNEIDER.